United States Patent
Ogasawara et al.

(10) Patent No.: US 6,466,387 B1
(45) Date of Patent: Oct. 15, 2002

(54) DATA RECORDING DISK AND DISK DRIVE DEVICE FOR REDUCING WASTED SPACE ON A DATA RECORDING DISK

(75) Inventors: Kenji Ogasawara, Fujisawa; Hiroshi Yanagisawa, Kamakura; Keiji Kobayashi, Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/124,271

(22) Filed: Jul. 29, 1998

(30) Foreign Application Priority Data

Jul. 29, 1997 (JP) .............................................. 9-202902

(51) Int. Cl.$^7$ ................................................. G11B 5/09
(52) U.S. Cl. .......................... 360/48; 360/77.08; 360/75
(58) Field of Search ............................... 360/77.07, 48, 360/77.02, 78.04, 78.08, 75, 78.14, 77.08

(56) References Cited

U.S. PATENT DOCUMENTS

| | | | | |
|---|---|---|---|---|
| 5,636,075 A | * | 6/1997 | Nishimura et al. | 360/78.14 X |
| 5,940,242 A | * | 8/1999 | Lee | 360/78.08 |
| 5,966,721 A | * | 10/1999 | Hirayama et al. | 360/48 X |
| 6,005,743 A | * | 12/1999 | Price et al. | 360/78.12 |
| 6,061,195 A | * | 5/2000 | Wilson et al. | 360/48 |
| 6,105,104 A | * | 8/2000 | Guttmann et al. | 360/78.08 X |

* cited by examiner

Primary Examiner—Andrew L. Sniezek
(74) Attorney, Agent, or Firm—Altera Law Group, LLC

(57) ABSTRACT

The present invention solves a problem that useless or wasted space exists on a data recording disk between read/write heads of narrower head width than others in the case that an uniform track pitch is used, and a head width of each head varies due to a fabrication tolerance. A data recording disk of the present invention comprises a first data recording surface and a second data recording surface, and a track pitch of adjacent data recording tracks of the first data recording surface differs from a track pitch of adjacent data recording tracks of the second data recording surface. All data recording tracks of the first data recording surface have substantially the same track width, and all gaps of the first data recording surface have substantially the same gap width, and, all data recording tracks of the second data recording surface have substantially the same track width, and all gaps of the second data recording surface have substantially the same gap width.

16 Claims, 13 Drawing Sheets

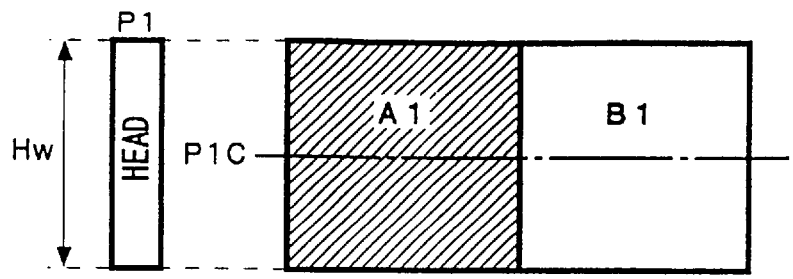
F I G. 5
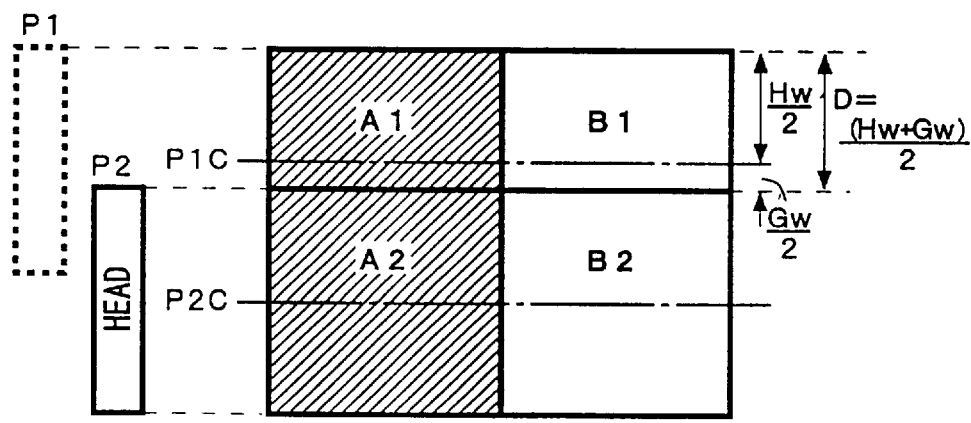
F I G. 6
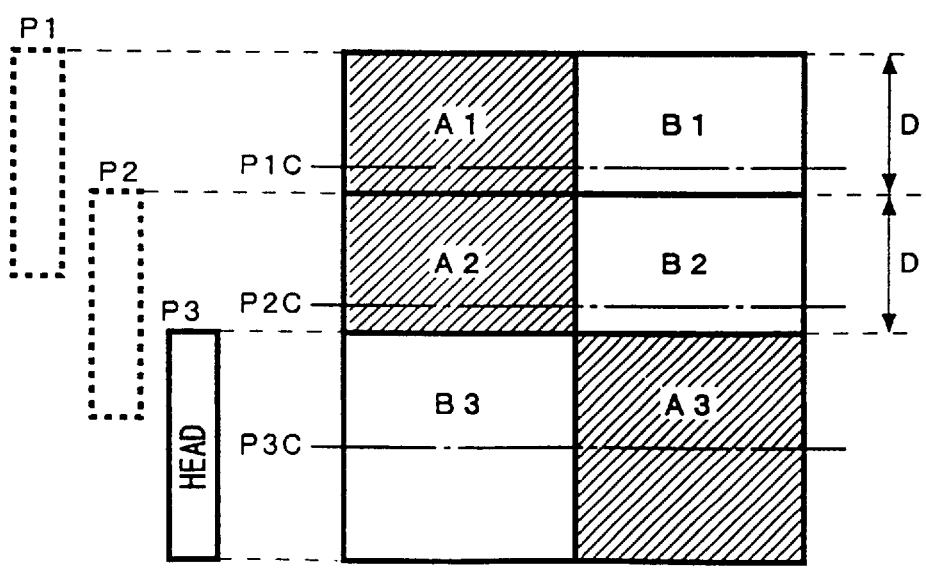
F I G. 7

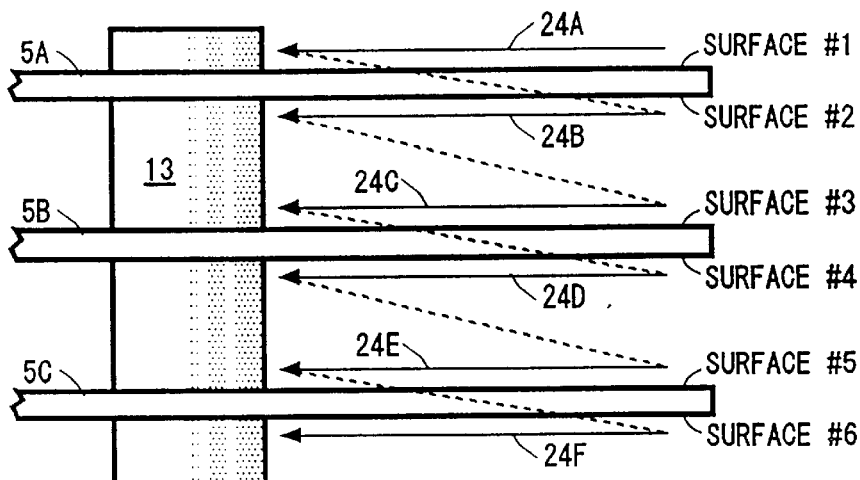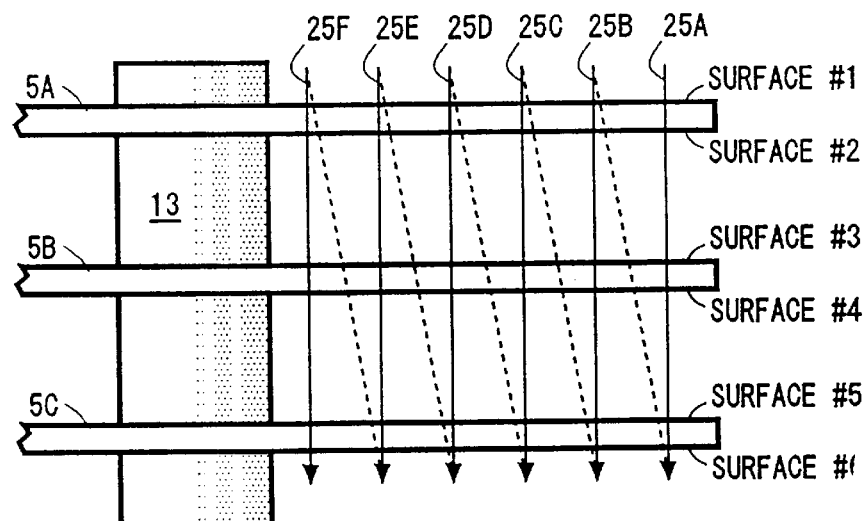
FIG. 16

DATA RECORDING DISK AND DISK DRIVE DEVICE FOR REDUCING WASTED SPACE ON A DATA RECORDING DISK

BACKGROUND OF THE INVENTION

1. Field of the Invention

The present invention relates to a data recording disk, a disk drive device and a method for writing servo patterns on a data recording surface of a rotating data recording disk, and more particularly to a method, data recording disk and disk drive having servo patterns that improve efficiency of head positioning and data storage.

2. Description of Related Art

A giant magneto resistive (GMR) head has been developed as a next generation read/write head of a hard disk drive device. The GMR head can generate an output signal which is larger than an output signal generated by a prior magneto resistive (MR) head. The capability of generating the large output signal causes a reduction of a head width of the GMR head.

The GMR head is fabricated by the fabrication process of the MR head, and hence a head width of the GMR head is determined by a tolerance of the fabrication process of the MR head. It is assumed that the head width of the prior MR head is 2 $\mu$m, (1 $\mu$m=$10^{-6}$ m), the head width of the GMR head is 1 $\mu$m, and the tolerance of the fabrication technology of the MR head is 0.4 $\mu$m. Since the tolerance of the 0.4 $\mu$m is applied to both the MR head and GMR head, the head width of the MR head is 2 $\mu$m±0.4 $\mu$m, that is, the track width of the MR head varies from 1.6 $\mu$m to 2.4 $\mu$m, and a variance of the head width is 20%. The head width of the GMR head is 1 $\mu$m±0.4 $\mu$m, that is, the head width of the GMR head varies from 0.6 $\mu$m to 1.4 $\mu$m, and a variance of the head width is 40%. In this manner, the variance of the head width of the MR head is 20%, while the variance of the head width of the GMR head is 40% which is larger than that of the MR head.

An uniform track pitch is used in the track arrangement of the prior MR technology. A track pitch is a distance between a track center of one track and a track center of the next track.

If the uniform track pitch of the MR head is used for the GMR head, the following first problem, as shown in FIG. 1 occurs. As described above, the head width of the GMR head varies from 0.6 $\mu$m to 1.4 $\mu$m. For simplifying the description, three kinds of the GMR heads 1, 2 and 3 are shown in FIG. 1, i.e., the GMR head 1 has the 1.4 $\mu$m head width, the GMR head 2 has the 1.0 $\mu$m head width, and the GMR head 3 has the 0.6 $\mu$m head width. The track width of all the tracks 1, 2 and 3 are the same width, i.e., 1.4 $\mu$m, which is the largest width of the GMR head, and the uniform track pitch is used for all the tracks. A gap is provided for separating the adjacent two tracks. And, the center of the GMR heads 1, 2 and 3 are aligned to the track center of each track, respectively. It is apparent that useless or wasted space exists between the GMR heads 1 and 2, and between the GMR heads 2 and 3.

The following second problem occurs with respect to the servo patterns provided in the track. The servo patterns A and B are written to define the tracks, and read by the head to generate a feedback signal which is supplied to a hard disk control device. The detail of the servo patterns A and B are shown in FIG. 4(B) and (C). The servo pattern A has alternately arranged opposite magnetization direction, and the servo pattern B has an uniform magnetization direction.

The hard disk control device responds to the feedback signal to position the center of the head on the track center. It is assumed that the GMR heads 1, 2 and 3 are shifted from the track center by a distance of 10% of the track pitch, as shown by the dashed line in FIG. 1. For example, it is assumed that the track pitch=track width×1.1=1.4 $\mu$m=1.1×1.6 $\mu$m, and the shift distance=track pitch×0.1=0.16 $\mu$m. In this case, the GMR heads 1, 2 and 3 are shifted with respect to the servo pattern B, and the variation of the levels of the feedback signals sensed by the GMR heads 1, 2 and 3 are as follows.

In the case of the GMR head 1 of the 1.4 $\mu$m head width: 0.16 $\mu$m/1.41 $\mu$m=0.114. That is, the level of feedback signal is reduced by 11.4%. In the case of the GMR head 2 of the 1.01 $\mu$m head width: 0.16 $\mu$m/1.0 $\mu$m=0.16. That is, the level of feedback signal is reduced by 16%. In the case of the GMR head 3 of the 0.6 $\mu$m head width: 0.16 $\mu$m/0.6 $\mu$m=0.267. That is, the level of feedback signal is reduced by 26.7%.

The variation of the levels of the feedback signal sensed by the prior MR head of 2.4 $\mu$m head width, the prior MR head of 2.0 $\mu$m head width, and the prior MR head of 1.6 $\mu$m head width are, as follows. It is assumed that the track pitch=track width×1.1=2.4 $\mu$m×1.1=2.6 $\mu$m, and the shift distance=track pitch×0.1=0.26 $\mu$m.

In the case of the MR head of the 2.4 $\mu$m head width: 0.26 $\mu$ m/2.4 $\mu$ m=0.108. That is, the level of the feedback signal is reduced by 10.8%. In the case of the MR head of the 2.0 $\mu$m head width: 0.26 $\mu$m /2.0 $\mu$m=0.13. That is, the level of the feedback signal is reduced by 13%. In the case of the MR head of the 1.6 $\mu$m head width: 0.26 $\mu$m/1.6 $\mu$m=0.163. That is, the level of the feedback signal is reduced by 16.3%.

In this manner, when the head is shifted by the distance of track pitch multiplied by A, the level of the feedback signal of the MR head to the hard disk control device varies from 10.8% to 16.3%, while the level of the feedback signal of the GMR head to the hard disk control device varies from 11.4% to 26.7%.

The range of the variation of the feedback signals to the hard disk control device should be small, since if the range of the variation becomes large, undesirable phenomenon, such as an oscillation of the entire servo system may occur.

It can be seen then that there is a need for a method, data recording disk and disk drive that eliminates useless or wasted space on a data recording disk.

It can also be seen that there is a need for a method, data recording disk and disk drive that provides a track pitch that varies depending o the track width.

It can also be seen that there is a need for a method, data recording disk and disk drive that provides a uniform level of variation I the feedback signals.

SUMMARY OF THE INVENTION

To overcome the limitations in the prior art described above, and to overcome other limitations that will become apparent upon reading and understanding the present specification, the present invention discloses a data recording disk that includes a first data recording surface and a second data recording surface, wherein a track pitch of adjacent data recording tracks of the first data recording surface differs from a track pitch of adjacent data recording tracks of the second data recording surface.

A data recording disk according to the present invention includes a first data recording surface and a second data recording surface, wherein the number of data recording tracks of the first data recording surface differs from the number of data recording tracks of the second data recording surface, and the a gap width between the data recording tracks of the first data recording surface differs from a gap width between the data recording tracks of the second data recording surface.

A data recording disk according to the present invention includes a first data recording surface and a second data recording surface, wherein the number of data recording tracks of the first data recording surface differs from the number of data recording tracks of the second data recording surface.

A disk drive device according to the present invention includes data recording surfaces on a rotating data recording disk, each of the data recording surfaces is provided with a read/write head, wherein the number of data recording tracks of a first data recording surface differs from the number of data recording tracks of a second data recording surface, and a gap width between the data recording tracks of the first data recording surface differs from a gap width between the data recording tracks of the second data recording surface.

All data recording tracks of the first data recording surface have substantially the same track width, and all gaps of the first data recording surface have substantially the same gap width.

All data recording tracks of the second data recording surface have substantially the same track width, and all gaps of the second data recording surface have substantially the same gap width.

Data is written in a direction from an outer most data recording track to an inner most data recording track of the first data recording surface, then the data is written in a direction from an outer most data recording track to an inner most data recording track of the second data recording surface.

Addresses of data recording tracks are successively assigned from an outer most data recording track to an inner most data recording track of the first data recording surface, and the address of the inner most data recording track of the first data recording surface is followed by an address of an outer most data recording track of the second data recording surface, and the addresses on the second data recording surface are successively assigned from the outer most data recording track to an inner most data recording track of the second data recording surface.

A method according to the present invention for writing servo patterns for defining a plurality of data recording tracks on a rotating data recording disk by a read/write head contained in a disk drive device, includes positioning the read/write head at one position along a radial direction of the rotating data recording disk, writing servo patterns on the rotating data recording disk by the read/write head positioned at the one position, reading the servo patterns by the read/write head positioned at the one position to detect an amplitude of output signal generated by the read/write head, moving the read/write head from the one position along the radial direction, reading the servo patterns by the read/write head moved from the one position to detect that an amplitude of output signal generated by the moved read/write head becomes 50−Gw/2% of the amplitude of output signal generated by the read/write head when it is positioned at the one position, wherein the $G_w$ is a predetermined gap width between the data recording tracks, stopping the read/write head when the detection is made, and overlappingly writing the servo patterns on the rotating data recording disk by the stopped read/write head.

A method according to the present invention for writing servo patterns for defining a plurality of data recording tracks on a rotating data recording disk by a read/write head contained in a disk drive device, includes specifying a gap width between adjacent data recording tracks, writing servo patterns for defining a plurality of data recording tracks separated by the specified gap width on the rotating data recording disk by the read/write head, detecting that the total number of data recording tracks is smaller than a predetermined number, specifying an overlap width of adjacent data recording tracks, and rewriting servo patterns for defining a plurality of data recording tracks overlapped each other by the overlap width on the rotating data recording disk by the read/write head, the rewriting of servo patterns including positioning the read/write head at one position along a radial direction of the rotating data recording disk, rewriting the servo patterns on the rotating data recording disk by the read/write head positioned at the one position, reading the rewritten servo patterns by the read/write head positioned at the one position to detect an amplitude of output signal generated by the read/write head, moving the read/write head from the one position along the radial direction, reading the rewritten servo patterns by the read/write head moved from the one position to detect that an amplitude of output signal generated by the moved read/write head becomes 50+Y/2% of the amplitude of output signal generated by the read/write head when it is positioned at the one position, wherein the Y is the overlap width, stopping the movement of the read/write head when the detection is made, and rewriting the servo patterns on the rotating data recording disk by the stopped read/write head stopped.

A method according to the present invention for writing servo patterns for defining a plurality of data recording tracks on each of a plurality of data recording surfaces on rotating data recording disks by a read/write head provided on each of the plurality of data recording surfaces contained is a disk drive device, includes specifying a gap width between adjacent data recording tracks, writing servo patterns on a plurality of servo tracks for defining the plurality of data recording tracks separated by the specified gap width on one data recording surface by its read/write head, storing a count value indicating the number of servo tracks written on the one data recording surface, repeating the writing of servo patterns and storing the count value until the servo patterns are written on all data recording surfaces, determining whether the total number of data recording tracks written on the data recording surfaces exceeds a predetermined number, or not, specifying an overlap width of adjacent data recording tracks, if the total number of data recording tracks written on data surfaces does not exceed the over the top width, finding the data recording surface containing the least number of data recording tracks by determining the count values of the all data recording surfaces, and rewriting the servo patterns for defining the plurality of data recording tracks overlapped each other by the overlap width on the data recording surface found to contain the least number of data recording tracks to its read/write head, the rewriting including positioning the read/write head at one position along a radial direction of the data recording surface, rewriting servo patterns on the data recording surface by the read/write head positioned at the one position, reading the rewritten servo patterns by the read/write head positioned at the one position to detect an amplitude of output signal generated by the read/write head, moving the read/write head from the one position along the radial direction, reading the rewritten servo patterns by the read/write head moved from the one position to detect that an amplitude of output signal generated by the moved read/write head becomes 50+Y/2% of the amplitude of output signal generated by the read/write head when it is positioned at the one position, wherein the Y is the overlap width, stopping the movement of the read/write head when the detection is made, and rewriting the servo patterns on the data recording surface by the stopped read/write head stopped.

A method according to the present invention for writing servo patterns for defining a plurality of data recording tracks on each of a plurality of data recording surfaces on rotating data recording disks by a read/write head provided on each of the plurality of data recording surfaces contained is a disk drive device, includes specifying a gap width between adjacent data recording tracks, positioning the read/write head at one position along a radial direction of one data recording surface, setting a count value of a counter to an initial value, writing servo patterns on the data recording surface by the read/write head positioned at the one position, reading the servo patterns by the read/write head positioned at the one position to detect an amplitude of output signal generated by the read/write head, moving the read/write head from the one position along the radial direction, reading the servo patterns by the read/write head moved from the one position to detect that an amplitude of output signal generated by the moved read/write head becomes $50-G_w/2\%$ of the amplitude of output signal generated by the read/write head when it is positioned at the one position, wherein the $G_w$ is the specified gap width between the data recording tracks, stopping the read/write head when the detection is made, incrementing the count value, overlappingly writing the servo patterns on the data recording surface by the stopped read/write head, repeating the reading, moving, reading and stopping until the servo patterns are entirely written on the one data recording surface, electing next data recording surface and repeating the positioning, setting, writing, reading, moving, reading, stopping, incrementing, overlapping and repeating, determining whether the total number of data recording tracks written on all data recording surfaces exceeds a predetermined number, or not, specifying an overlap width of adjacent data recording tracks, if the total number of data recording tracks written on all data recording surfaces does not exceed the predetermined number, finding the data recording surface containing the least number of data recording tracks by determining the count values of the all data recording surfaces, and rewriting the servo patterns for defining the plurality of data recording tracks overlapped each other by the overlap width on the data recording surface found containing the least number of data recording tracks by its read/write head, the rewriting including positioning the read/write head at one position along a radial direction of the data recording surface, rewriting servo patterns on the data recording surface by the read/write head positioned at the one position, reading the rewritten servo patterns by the read/write head positioned at the one position to detect an amplitude of output signal generated by the read/write head, moving the read/write head from the one position along the radial direction, reading the rewritten servo patterns by the read/write head moved from the one position to detect that an amplitude of output signal generated by the moved read/write head becomes $50+Y/2\%$ of the amplitude of output signal generated by the read/write head when it is positioned at the one position, wherein the Y is the overlap width, stopping the movement of the read/write head when the detection is made, and rewriting the servo patterns on the data recording surface by the stopped read/write head stopped.

The total number of data recording tracks written on the all data recording surfaces is determined by referring to the count values of the all data recording surfaces.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The present invention is illustrated by way of example and not limitation in the figures of the accompanying drawings, in which like references indicate similar elements, and in which:

FIG. 5 shows a step for writing the servo patterns of the present invention;

FIG. 6 shows a step for writing the servo patterns of the present invention;

FIG. 7 shows the servo patterns of the present invention;

FIGS. 16(A)–(B) show the addressing scheme of the hard disk drive device of the present invention and the prior hard disk drive device.

DETAILED DESCRIPTION OF THE PREFERRED EMBODIMENT

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

Figure 2:
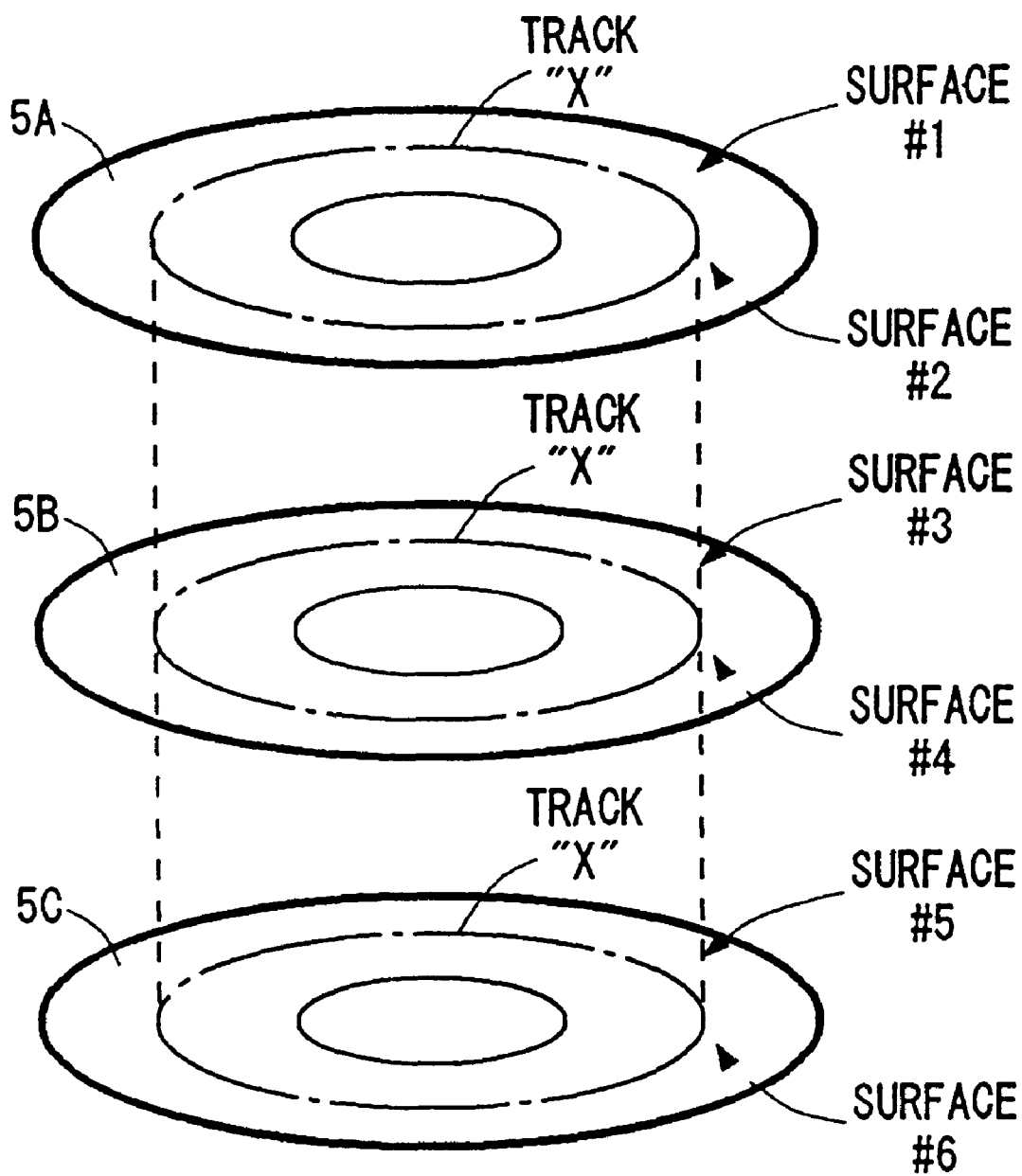
FIG. 2 shows the three magnetic recording disks describing a cylinder concept used in the prior hard disk drive device.

FIG. 2 shows three magnetic recording disks 5A, 5B and 5C contained in a hard disk drive device. The three disks are shown as one example, and more disks can be contained in the hard disk drive device.

An upper surface and a lower surface of each disk are used as the data recording surface, and hence the three magnetic recording disks 5A, 5B and 5C provide the data recording surfaces #1 through #6. The density of the data recording tracks in the radial direction of the disk is measured according to TPI (Tracks Per Inch), and the data density along the circular data recording track is measured according to BPI (Bits Per Inch). One data read/write head is provided for each data recording surface. For Example, six data read/write heads may be provided. Each data read/write head is mounted on a slider assembly, which is mounted on the front end of a head supporting arm. The combination of the head and the slider assembly is called as a head/slider assembly. Since the head/slider assembly and the head supporting arm are well known in the art, these are not shown in FIG. 2. The rear ends of the head supporting arms are fixed each other, and are pivotally mounted on a frame of the hard disk drive device. The head supporting arms are rotated at the pivot point by a voice coil motor to move the read/write heads along the radial direction of the data recording surfaces.

In the prior hard disk drive device, the number of data recording tracks of each of the six data recording surfaces are the same, and the same track pitch is used. Accordingly, when the read/write head of the data recording surface #1 is positioned at the data recording track "X", e.g. the Xth track from an outer most data recording track or an inner most data recording track, the remaining all read/write heads of the data recording surfaces #2 through #6 are positioned at the same data recording tracks "X" of the data recording surfaces #2 through #6, as the data recording track "X" of the surface #1, as shown by a dashed lines in FIG. 2. The six data recording tracks "X" are called as one data cylinder, and the data are simultaneously read from or written to one data cylinder.

The present invention does not use the concept of such data cylinder, as being apparent from the description hereinafter.

Figure 3:
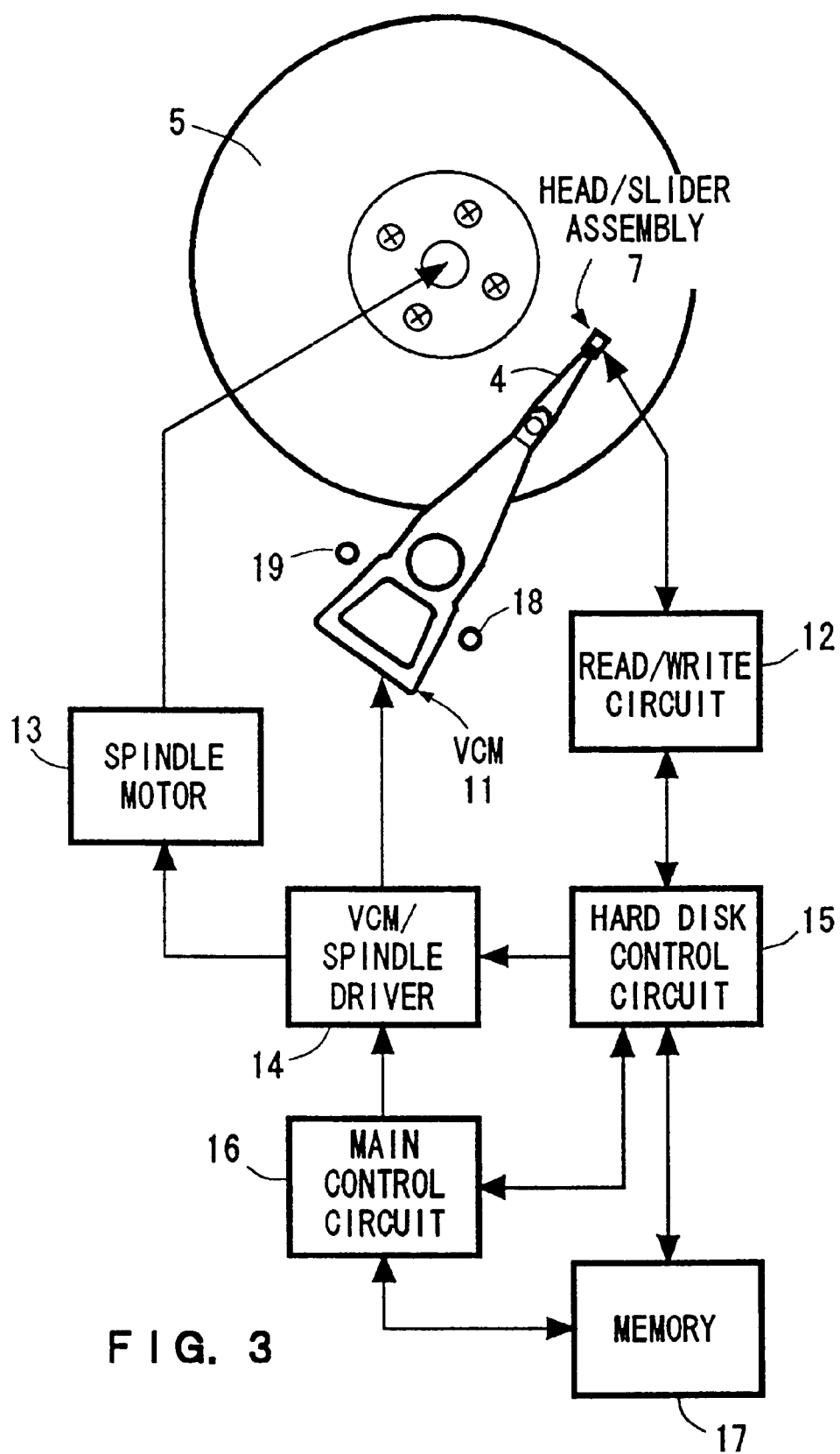
FIG. 3 shows a block diagram of circuits contained in the hard disk drive device.

FIG. 3 shows a block diagram of the circuits contained in the hard disk drive device. A spindle motor 13 for rotating the magnetic recording disk 5 and the voice coil motor (VCM) 11 are controlled by a VCM/spindle driver 14. Only one magnetic recording disk 5 is shown for simplifying the drawing. The read/write circuit 12 is connected to a hard disk control circuit 15, which is also connected to the VCM/spindle driver 14. A memory 17 for storing data and control data is connected to the circuit 15 and a main control circuit or MPU 16, which controls the VCM/spindle driver 14, the hard disk control circuit 15 and the memory 17. The read/write head is mounted on a slider, these are called as a head/slider assembly 7. The head/slider assembly 7 is mounted on the front end of a supporting arm 4. And, the rear end of the supporting arm 4 is pivotally mounted on the frame of the hard disk drive device.

An inner crash stop 18 is mounted on the frame to engage the head supporting arm 4 to position the head on an inner most data recording track, and an outer crash stop 19 is mounted on the frame to engage the head supporting arm 4 to position the head on an outer most data recording track.

Figure 4:
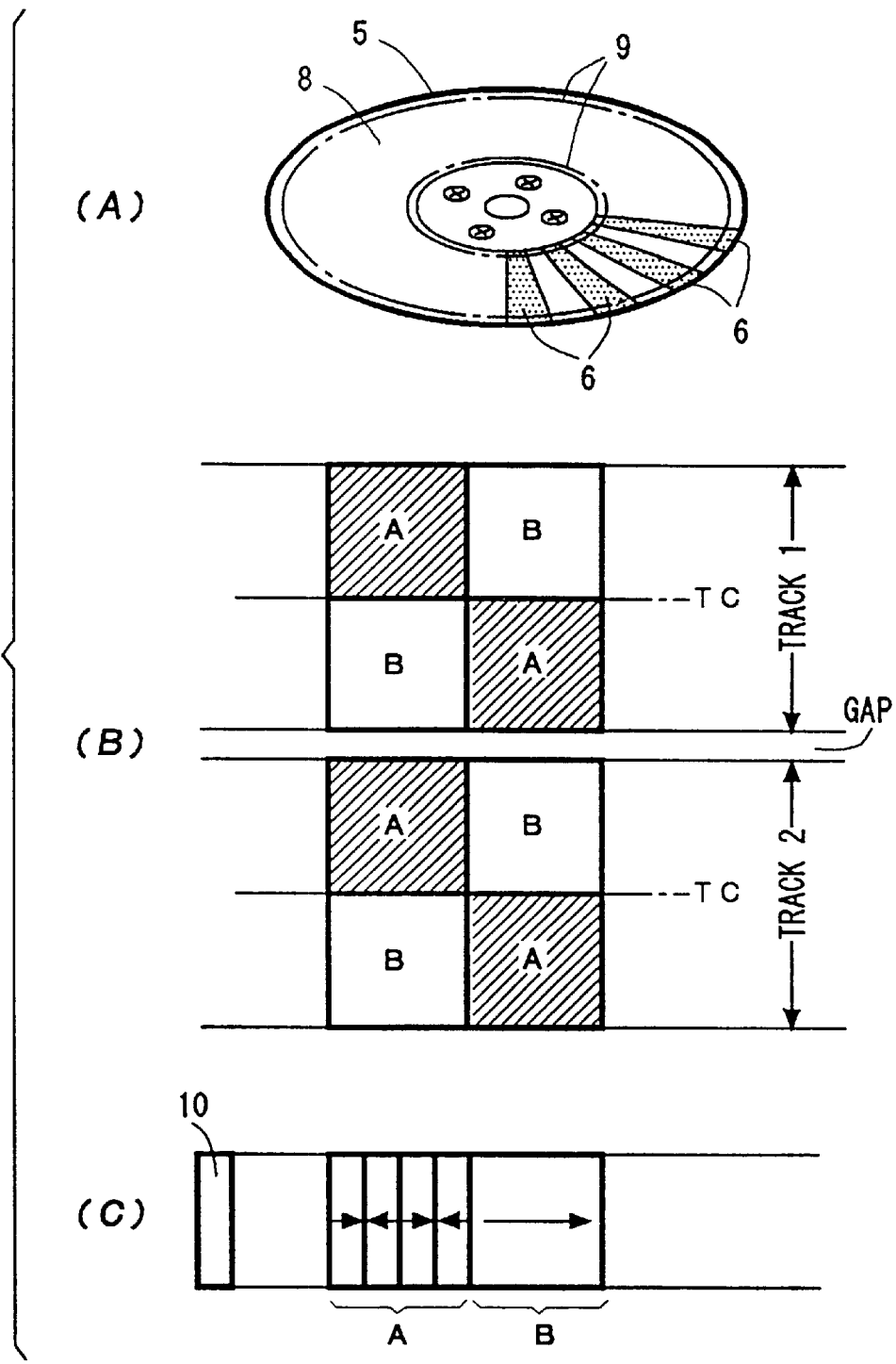
FIGS. 4(A)–(C) show one data recording disk, and the data recording tracks defined by the servo patterns.

FIG. 4(A) shows one magnetic recording hard disk 5. The recording surface 8 is divided into a plurality of sectors, and the servo patterns are written in portions 6. The circular data recording tracks 9 are defined by the servo patterns. For simplifying the drawing, only two tracks 9, i.e., the inner most track and the outer most track and four portions 6 are shown in FIG. 4.

FIG. 4(B) shows an enlarged portion of the data recording tracks #1 and #2 and the servo patterns A and B. The servo patterns A and B are written or recorded to define the tracks #1 and #2, as shown in FIG. 4(B) and read by the read/write head to generate a feedback signal which is supplied to the hard disk control device 15. The detail of the servo patters A and B are shown in FIG. 4(C). The servo pattern A has alternately arranged opposite magnetization direction, and the servo pattern B has an uniform DC magnetization direction. The hard disk control device 15 responds to the feedback signal to position the center of the head on the track center (TC).

Figure 1:
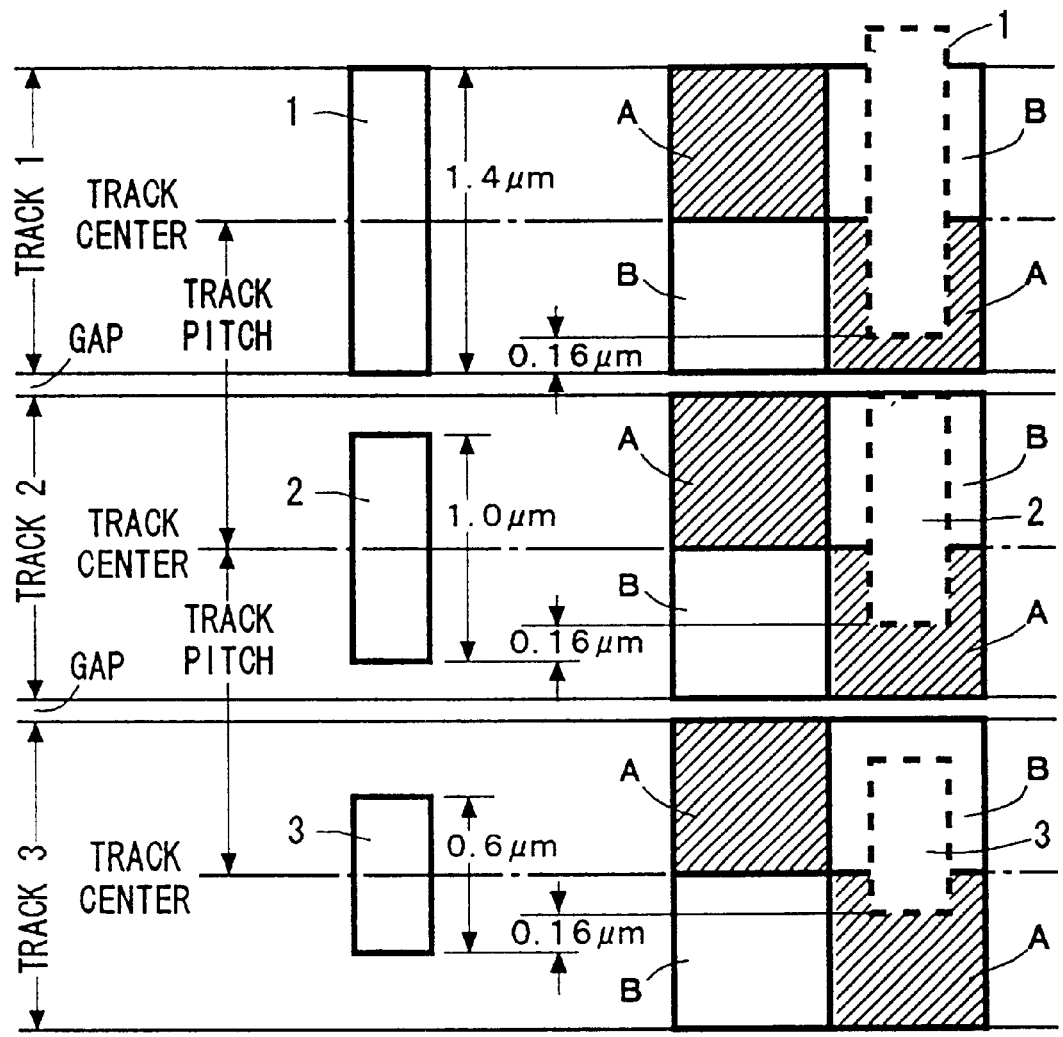
FIG. 1 shows a problem caused by arranging the GMR heads in the prior data tracks with an uniform track pitch.

The present invention removes the large useless or waste spaces between the GMR head on the data recording surface in the prior track arrangement using the same track width, as described with reference to FIG. 1. It is assumed that (A) the hard disk drive device includes six data recording surfaces #1 through #6, as shown in FIG. 2, (B) the read/write head #1 reads or writes the data on the surface #1, the read/write head #2 reads or writes the data on the surface #2, the read/write head #3 reads or writes the data on the surface #3, and the read/write head #4 through #6 reads or writes the data on the data recording surfaces #4 through #6, respectively, (C) the heads have the head width shown in the following TABLE 1, and (D) the heads #1 through #6 and the sliders are mounted on the six supporting arms, respectively, and the rear ends of the six porting arms are fixed each other, and pivotally mounted on the frame.

TABLE 1

| HEAD | HEAD WIDTH |
|---|---|
| Head #1 of surface #1 | 1.0 μm |
| Head #2 of surface #2 | 0.6 μm |
| Head #3 of surface #3 | 1.4 μm |
| Head #4 of surface #4 | 1.0 μm |
| Head #5 of surface #5 | 0.6 μm |
| Head #6 of surface #6 | 1.4 μm |

The head width represents the dimension along the radial direction of the data recording surface.

It is noted that, in the prior cylinder type hard disk drive device, the number of data recording tracks of all the data recording surfaces are the same. In contradistinction, in the present invention, the number of data recording tracks of one data recording surface, such as the surface #1 differs from the number of data recording tracks of another data recording surface, such as the surface #2, and the a gap width between the data recording tracks of one data recording surface differs from a gap width between the data recording tracks of another data recording surface.

All data recording tracks of the first data recording surface have substantially the same track width, and all gaps of the first data recording surface have substantially the same gap width.

All data recording tracks of the second data recording surface have substantially the same track width, and all gaps of the second data recording surface have substantially the same gap width.

Figure 8:
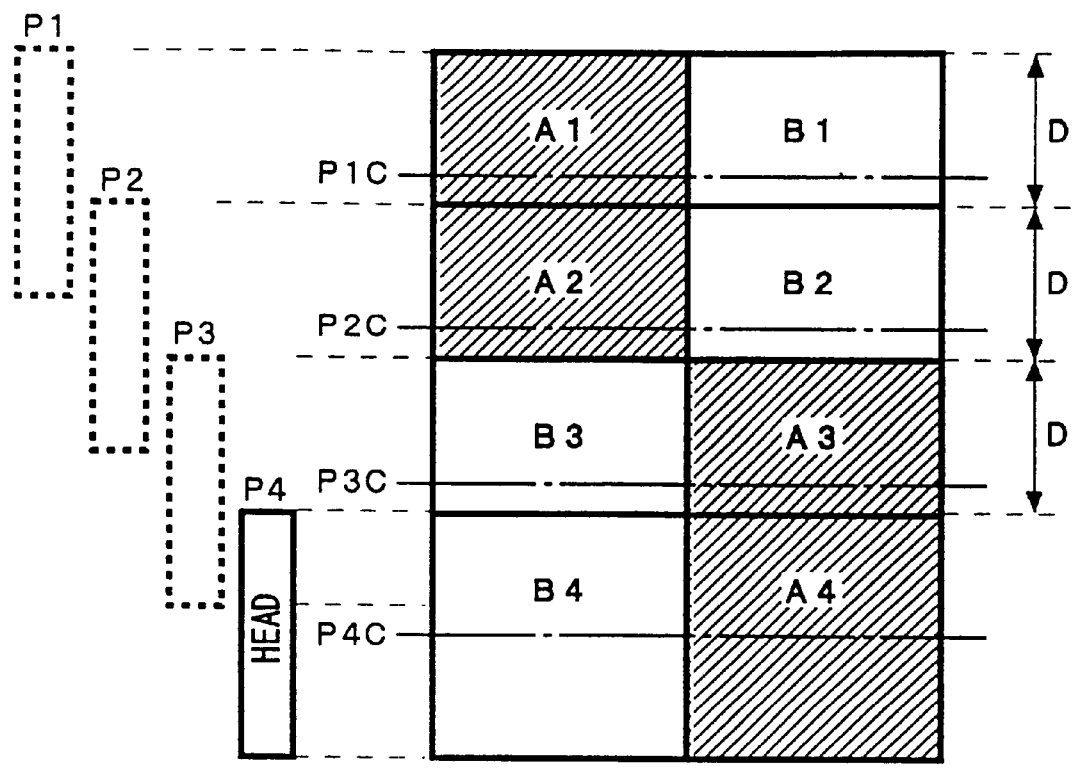
FIG. 8 shows the servo patterns of the present invention.
Figure 9:
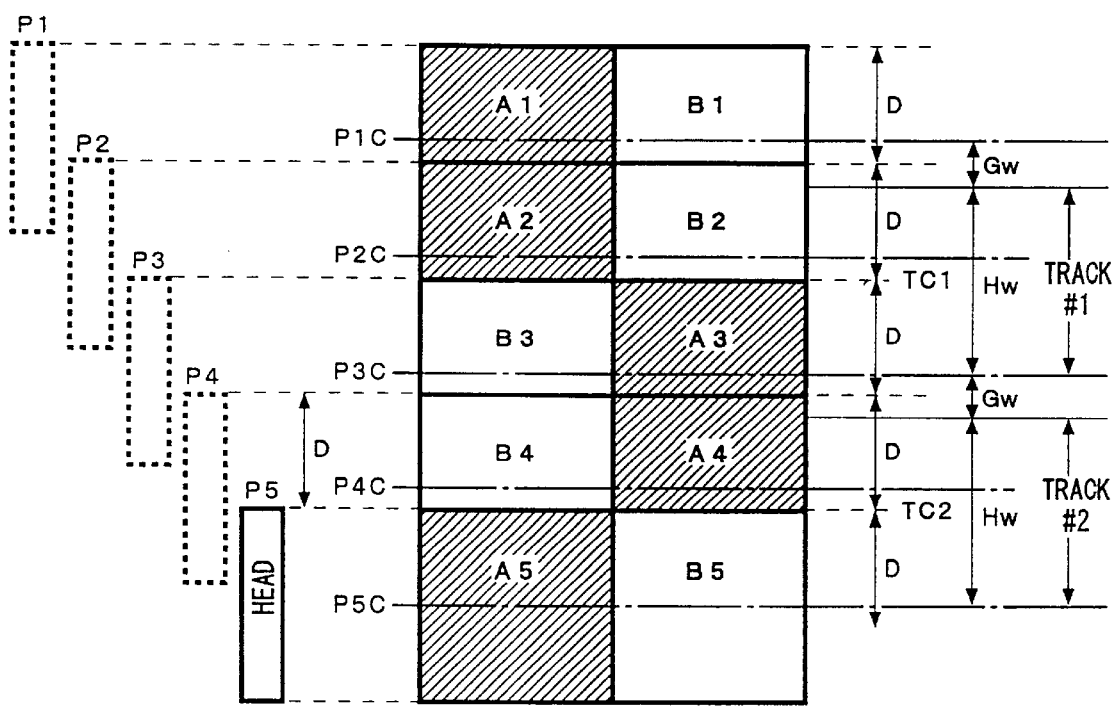
FIG. 9 shows the servo patterns of the present invention.
Figure 10:
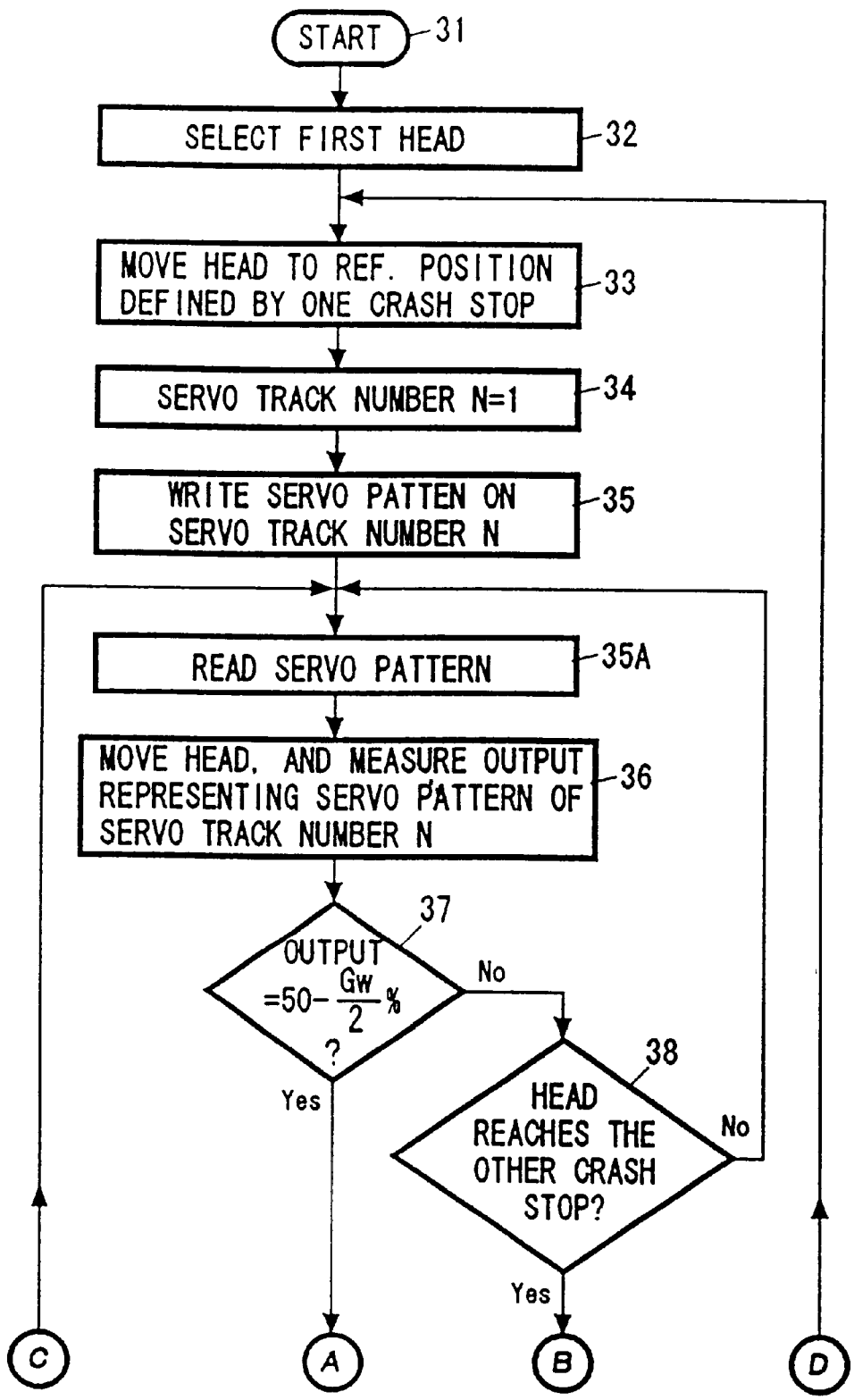
FIG. 10 shows a flow chart for writing the servo patterns.
Figure 11:
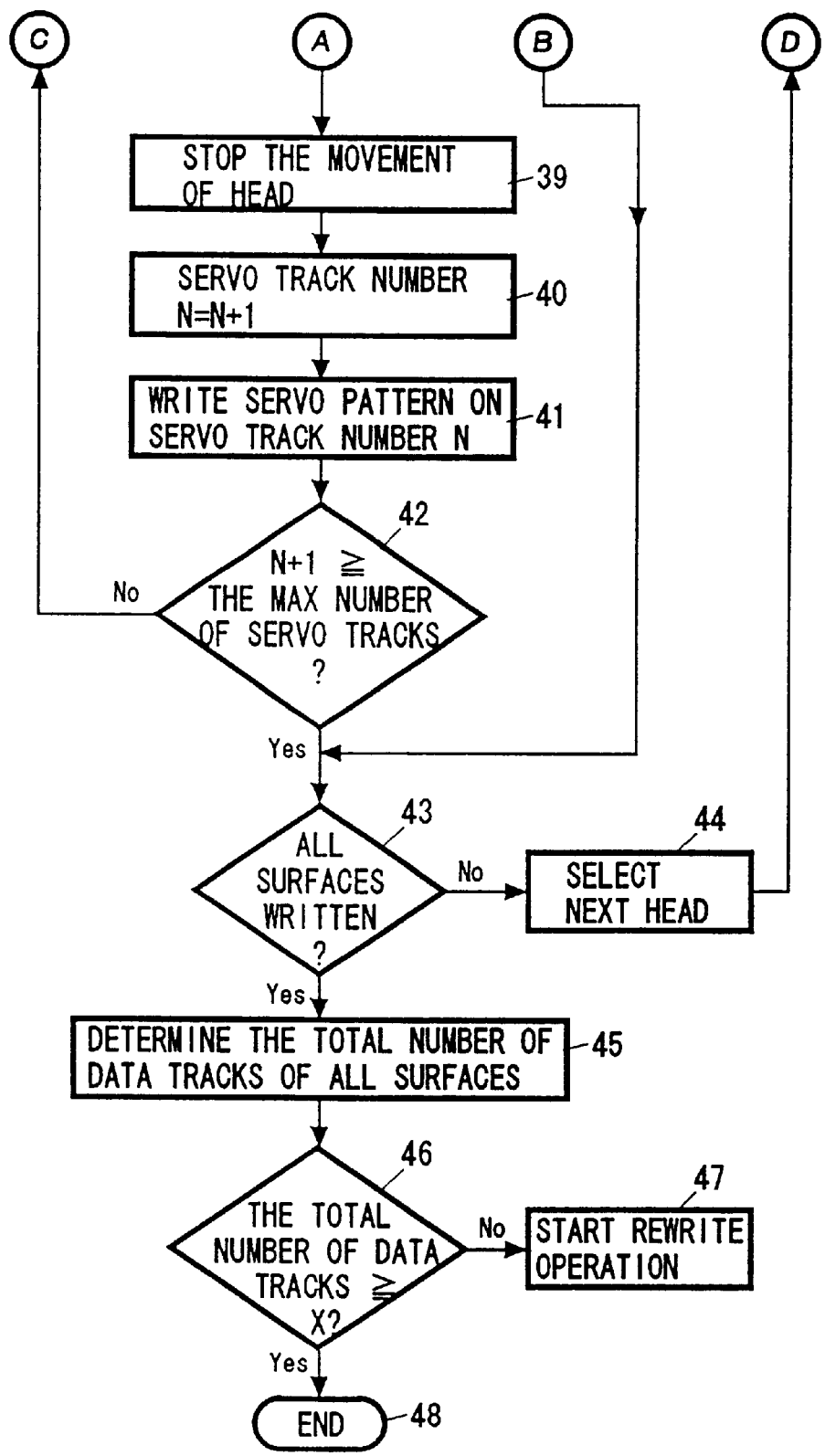
FIG. 11 shows a flow chart for writing the servo patterns.

FIGS. 10 and 11 show a flow chart of the operation in accordance with the present invention and FIGS. 5 through 9 show the operation for writing the servo patterns A and B on one data recording surface by using its read/write head.

The operation starts in a block 31 in FIG. 10. The operation proceeds to a block 32 in which the MPU 16 selects the first data recording surface #1. During the operation for writing the servo patterns on the first data recording surface #1, only the head #1 is activated or operated, and the remaining heads #2 through #6 are not operated.

The operation proceeds to a block 33 in which the MPU 16 and the VCM/spindle driver 14 move the head supporting arm 4 by applying a drive current to the VCM 11 until the arm 4 is stopped by the inner crash stop 18, so that the head #1 is positioned at the reference position P1, i.e., the inner most data recording track.

The operation proceeds to a block 34 in which a servo track number N is set to 1. The operation proceeds to a block 35 in which the servo pattern is written on the servo track number N. In the operation of the block 35, the head #1 is positioned at the position P1, as shown in FIG. 5. That is, the servo patterns A and B are written in the data recording surface #1, and in this case the head #1 for the surface #1 has the head width $H_w$ of 1.0 μm.

In FIG. 5, a position P1C indicates a center of the head #1 located at the position P1. The servo patterns A1 and B1 are recorded in the servo track #1. To write the servo patterns A1 and B1, the read/write circuit 12 in FIG. 3 applies the alternate signal to the head #1 to write the pattern A, and applies the DC signal to the head #1 to write the pattern B. For simplifying the drawing, only two servo patterns are shown.

The operation proceeds to a block 35A in which the head #1 is stopped at the position P1, and reads the servo patterns A1 and B1, and an amplitude of an output signal of the head #1 is detected by the MPU 16 and stored in the memory 17.

The operation proceeds to a block 36 in which the head #1 is moved from the position P1 toward the outer most position, and during this movement, an amplitude of the output signal from the head #1 reading the servo patterns A1 and B1 is measured by the MPU 16.

The operation proceeds to a block 37 in which the MPU 16 determines whether an amplitude of the output signal is decreased to a value of $50-G_w/2\%$ of the amplitude (100%) measured in the block 35A, or not. The value 100% indicates the full amplitude of the output signal when the head #1 fully overlaps on the servo patterns A1 and B1 in the block 35A. The $G_w$ is a width of the gap between the data recording tracks.

Figure 12:
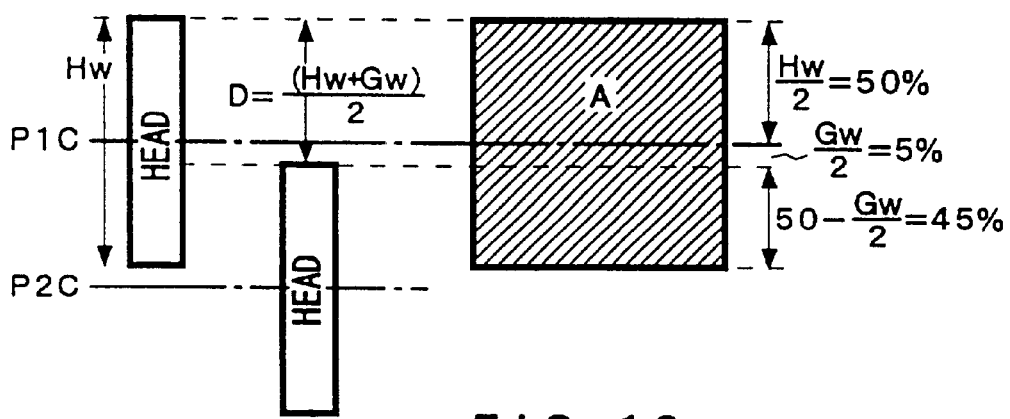
FIG. 12 shows the movement of the head from one position to next position.

In this embodiment, the width $G_w$ of the gap is selected to 10% of the head width $H_w$, so that the decrease of the amplitude of the output signal to the value $50-G_w/2\%$, i.e., 50−5%=45% indicates that the 1.0 μm head #1 is moved by the distance $D=(H_w+G_w)/2=0.05$ μm from the position P1, as shown in FIG. 12.

If the answer of the block 37 is NO, the operation proceeds to a block 38 in which the MPU 16 determines whether the head reaches the outer crash stop 19. If the answer of the block 38 is YES, the operation proceeds to a block 43 in FIG. 11 . If the answer of the block 38 is NO, the operation returns back to the block 36. If the answer of the block 37 is YES, it indicates the head #1 is moved to a position P2 shown in FIG. 6. The operation proceeds to a block 39 in FIG. 11 in which the movement of the head #1 is stopped at the position P2.

The operation proceeds to a block 40 in which the servo track number is incremented to N+1. The operation proceeds to a block 41 in which the head #1 stopped at the position P2, as shown in FIG. 6, overlappingly writes the servo patterns A2 and B2 on the servo patterns A1 and B1, respectively. It is apparent that the distance between the top edge of the servo patterns A1 and B1 and the position P1C is $H_w/2$, i.e., 0.5 μm and the distance between the position P1C and the top edge of the servo patterns A2 and B2 is $G_w/2$, which is 5% of the head width Hw, i.e., 0.05 μm.

The operation proceeds to a block 42 in which the MPU 16 determines whether the number N+1 is equal to or larger than the predetermined maximum number of servo tracks, such as 10000 servo tracks, or not. If the answer of the block 42 is NO, the operation returns to the block 35A, and the operation of the blocks 35A through 42 is repeated.

FIGS. 7 through 9 show the servo patterns recorded in this repeated operation. In FIG. 7, the head #1 is moved by the distance $D=(H_w+G_w)/2$ from the position P2 to the position P3. At the position P3, the head #1 overlappingly writes the servo patterns B3 and A3 on the servo patterns A2 and B2, respectively. It is apparent that the lower portion of the servo pattern A2 is replaced by the servo pattern B3, and the lower portion of the servo pattern B2 is replaced by the servo pattern A3. In FIG. 8, the head #1 is moved by the distance $D=(H_w+G_w)/2$ from the position P3 to the position P4. At the position P4, the head #1 overlappingly writes the servo patterns B4 and A4 on the servo patterns B3 and A3, respectively. In FIG. 9 , the head #1 is moved by the distance $D=(H_w+G_w)/2$ from the position P4 to the position P5. At the position P5, the head #1 overlappingly writes the servo patterns A5 and B5 on the servo patterns B4 and A4, respectively. It is apparent that the lower portion of the servo pattern B4 is replaced by the servo pattern A5, and the lower portion of the servo pattern A4 is replaced by the servo pattern B5.

In this manner, the head #1 is repeatedly moved by the distance $D=(H_w+G_w)/2$ towards the outer most position on the data recording surface, and at each position, the head #1 writes the new servo patterns. When the head #1 has written the sufficient number of servo tracks as indicated by the answer YES of the block 42, the operation for writing the servo pattern A and B on the first data recording surface #1 is completed. A counter contained in the hard disk control circuit 15 or the main control circuit 16 counts the number of the movement of the head by the distance $D=(H_w+G_w)/2$ in the radial direction, and count value is stored in the memory 17, whereby the main control circuit 16 knows the number of servo tracks written on the surface by referring to the count values in the counter.

Referring to FIG. 9 again, during the read/write operation, the head #1 senses the servo patterns A and B to supply the feedback signal to the hard disk control circuit 15 through the read/write circuit 12 shown in FIG. 3. The hard disk control circuit 15 responds to the feedback signal to control the VCM/spindle driver 14, so that the VCM 11 moves the supporting arm 4 to align the center of the head #1 at the boundary of the patterns A2 and B2 and the patterns B3 and A3. This boundary is called as the track center TC, TC1 in this case , and the data recording track #1 is defined when the data recording disk is rotated in the read/write operation. The width of the data recording track is equal to the head width $H_w$ of the head #1, in this case 1.0 μm. Explaining the track center TC1 of the data recording track #1 and the track center TC2 of the data recording track #2, the distance between the TC1 and the TC2 is equal to $2D=H_w+G_w$, in other words, the gap $G_w$ which is 10% of the head width $H_w$ exists between the data recording track #1 and the data recording track #2.

The operation proceeds to a block 43 in which the MPU 16 determines whether the servo patterns have been written on all the recording surfaces, or not. If the answer of the block 43 is NO, the operation proceeds to a block 44 in which the MPU 16 selects the next head #2. The operation returns to the block 33, and the operation of the blocks 33 through 43 is repeated to write the servo patterns A and B on the remaining data recording surfaces #2 through #6 in the manner as described above. In these repeated operation, the servo patterns are written on the second data recording surface #2 by using the second head #2 of the head width of 0.6 μm. During the operation for writing the servo patterns on the second data recording surface #2, only the head #2 is activated or operated, and the remaining heads #1, and #3 through #6 are not operated. It is apparent that the head width $H_w$ of the head #2, i.e., the width of the data recording track, is 0.6 μm, and the gap width $G_w$ is 10%, i.e., 0.06 μm. When the servo patterns are written on the third data recording surface #3 by using the third head #3 of the head width of 1.4 μm, only the head #3 is activated or operated, and the remaining heads #1, #2 and #4 through #6 are not operated. The width of the data recording track is 1.41 μm and the gap width is 10%, i.e., 0.14 μm. The fact that the servo patterns have been written on all the recording surfaces #1 through #6 is indicated by the answer YES of the block 43. The data recording surfaces #1 through #6 have the following data track width and the gap width, as shown in the TABLE 2. The track pitch of the adjacent data tracks of the data recording surfaces #1 (#4), #2 (#5) and #3 (#6) differs from each other.

TABLE 2

| HEAD AND SURFACES | DATA RECORDING TRACK WIDTH | GAP WIDTH (10% of $H_w$) |
|---|---|---|
| Head #1 of surface #1 | 1.0 μm | 0.1 μm |
| Head #2 of surface #2 | 0.6 μm | 0.06 μm |
| Head #3 of surface #3 | 1.4 μm | 0.14 μm |
| Head #4 of surface #4 | 1.0 μm | 0.1 μm |
| Head #5 of surface #5 | 0.6 μm | 0.06 μm |
| Head #6 of surface #6 | 1.4 μm | 0.14 μm |

As the head width becomes wider, the number of the tracks on the surface is decreased, and the width of the gap is increased. The surfaces #3 and #6 have the smallest number of tracks than that of the remaining tracks, and the surfaces #3 and #6 have the widest gaps. This means that the data capacity of the data recording surfaces #3 and #6 is smaller than that of the remaining surfaces. As described before, the main control circuit 16 stores the number of servo tracks on the surfaces #1 through #6. In the next step, the operation proceeds to a block 45 in which the MPU 16 determines the total number of data recording tracks (N1) on all the data recording surfaces #1 through #6 based upon the count values, i.e., the total number of the servo tracks (N2) on the data recording surfaces #1 through #6. In this determination, the following expression is used: N1=N2/2−1.

The operation proceeds to a block 46 in which the MPU 16 determines whether the total number N1 is equal to or larger than a predetermined number "X", or not. If the answer of the block 46 is YES, the operation proceeds to a block 48 in which the operation is terminated. If the answer of the block 46 is NO, the MPU 16 starts the following operation for rewriting the servo patterns which causes the adjacent data recording tracks to overlap each other, as shown in FIGS. 13 and 14

Figure 13:
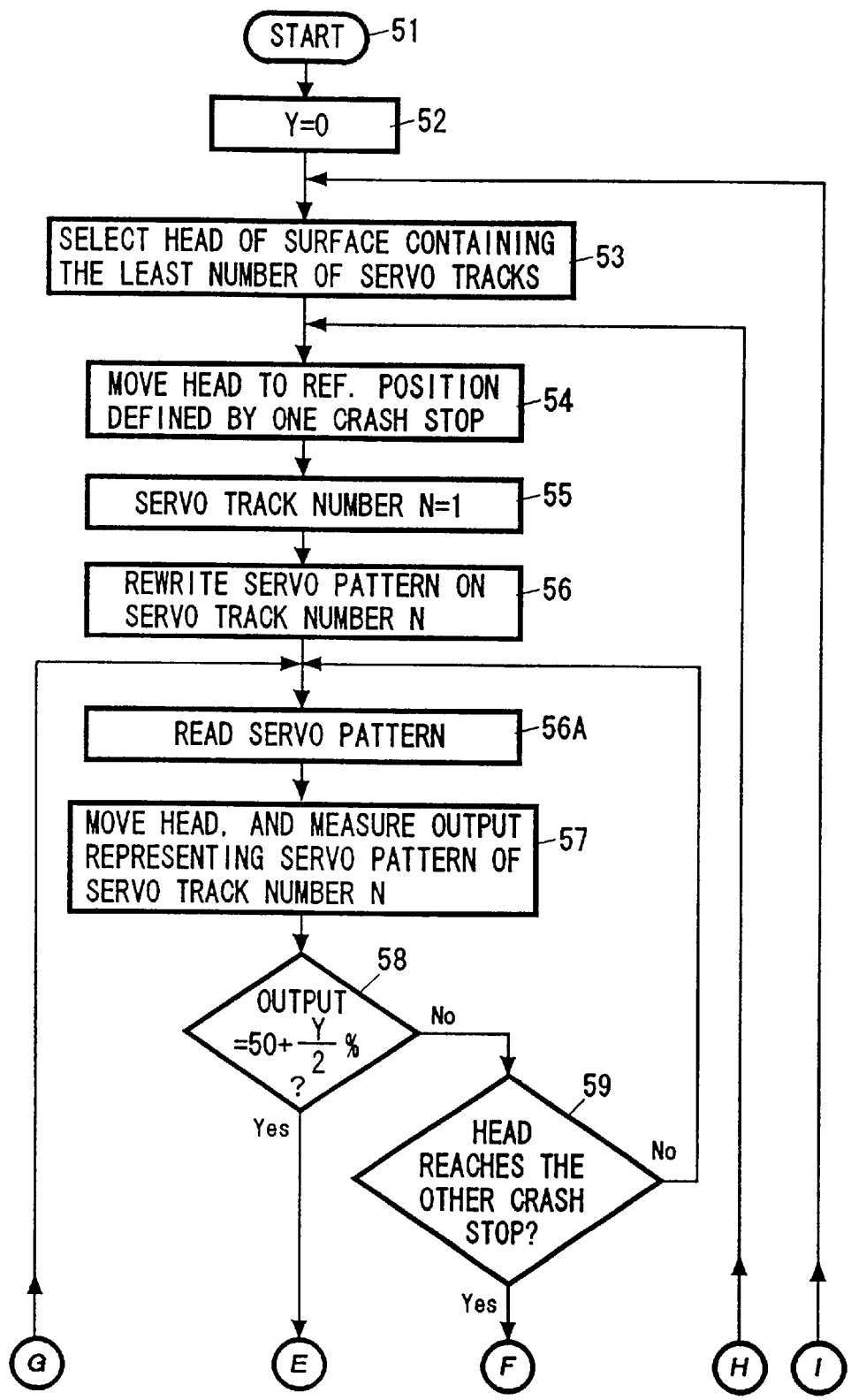
FIG. 13 shows a flow chart for rewriting the servo patterns.
Figure 14:
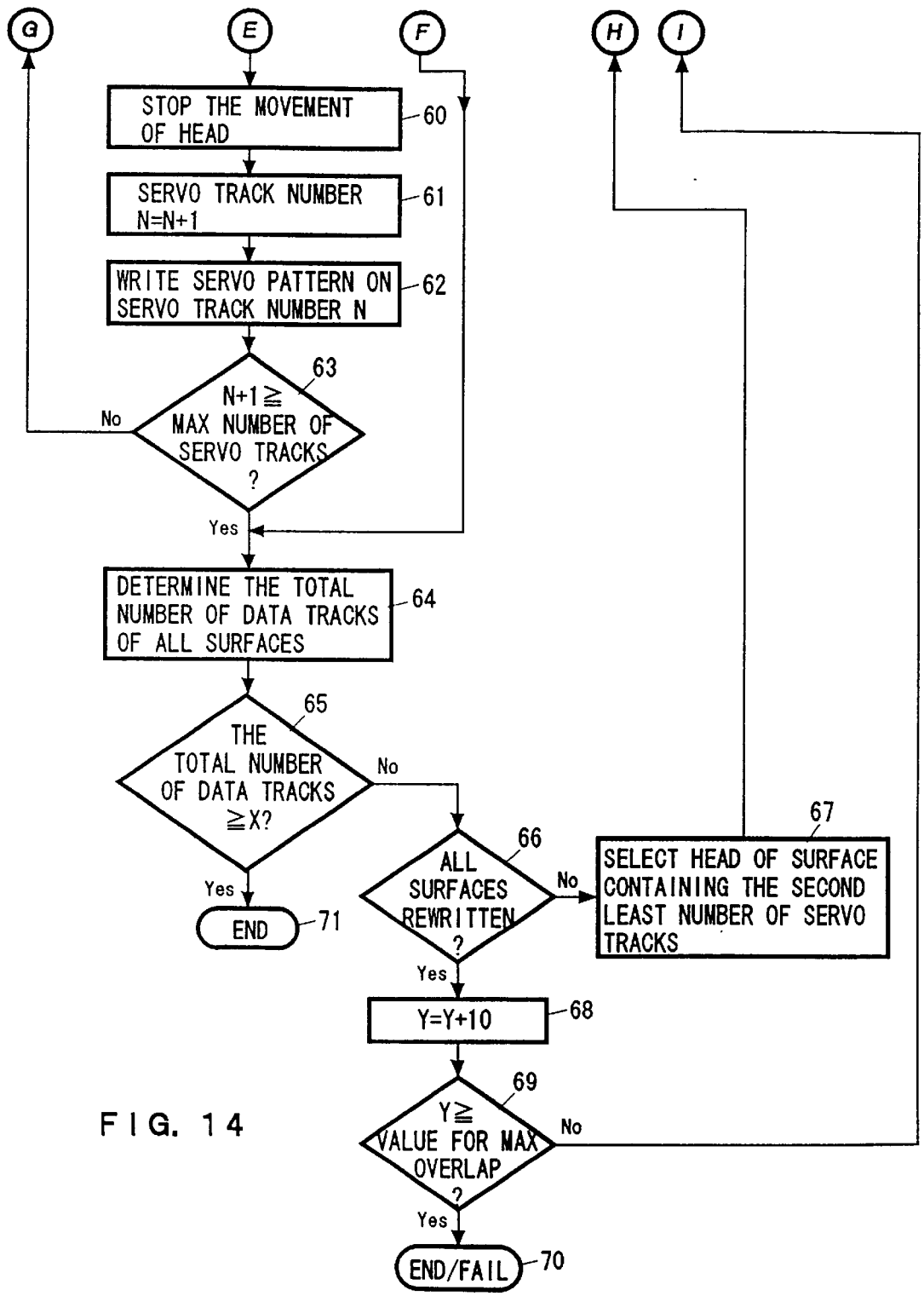
FIG. 14 shows a flow chart for rewriting the servo patterns.

Referring to FIGS. 13 and 14, the operation starts in a block 51. The operation proceeds to a block 52 in which the MPU 16 specifies Y=0, wherein the Y represents a value for specifying the overlap width of the adjacent data recording tracks, as follows: Overlap width=Head width ($H_w$)×Y (%).

Figure 15:
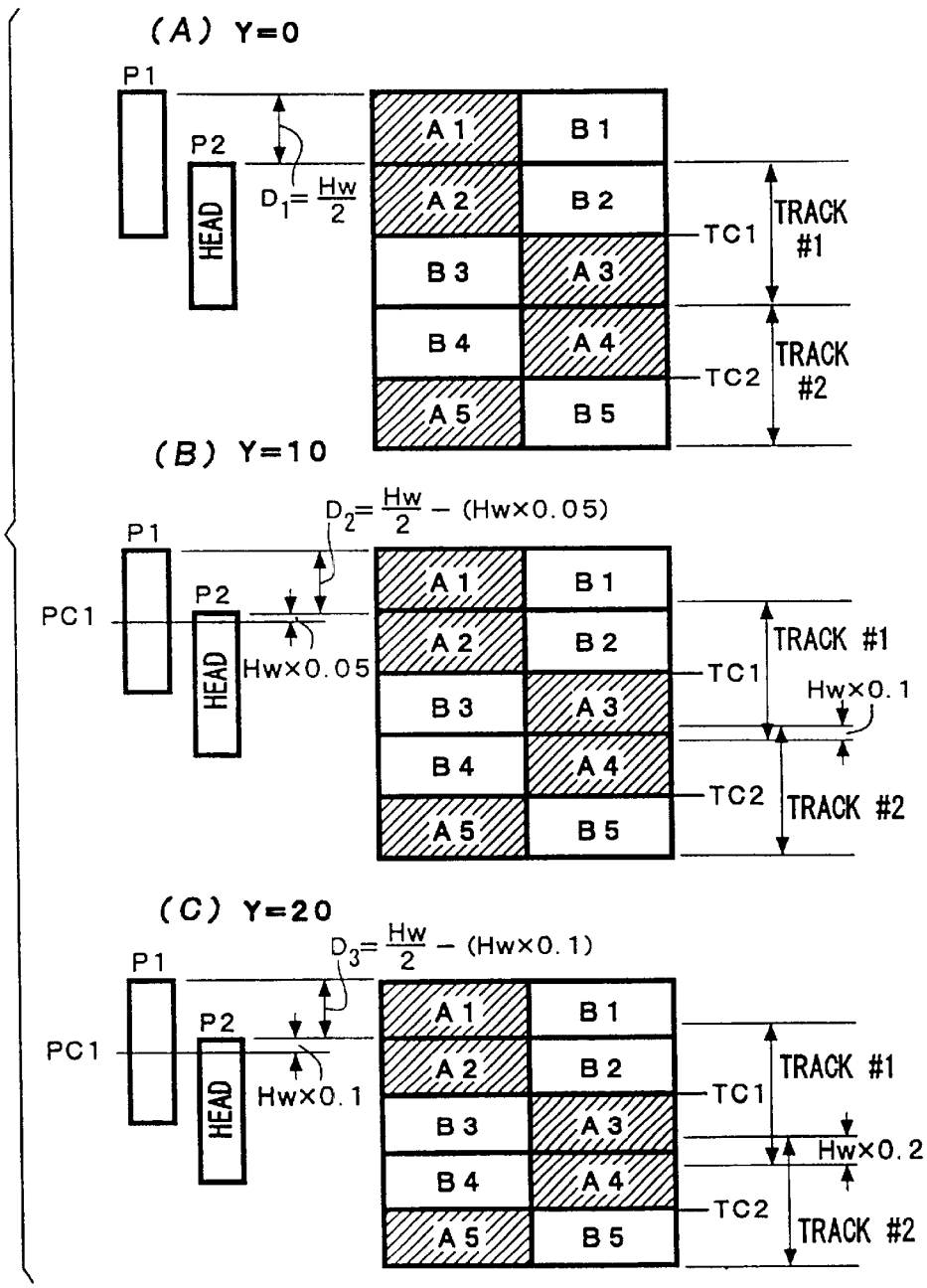
FIGS. 15(A)–(C) show the operation for rewriting the servo patterns.

The Y=0 indicates that the overlap width of the adjacent data recording tracks #1 and #2 is zero, and the gap between the data recording tracks #1 and #2 is zero ($G_w$=0), as shown in FIG. 15(A), in other words, the servo patterns A and B are rewritten to form or define the data recording tracks #1 and #2 adjacent each other without any overlap and any gap, as shown in FIG. 15(A).

The reason for specifying the value Y=0 at first in the block 52 is that the data recording tracks in the data recording surface containing the least number of servo tracks, and hence the least number of data recording tracks, have the widest track width, so that a probability of occurrence of error and a probability of decrease of S/N ratio is considered to be low in the widest data track, even if the gap width between the data recording tracks is decreased to zero, and further a portion of edges of the adjacent data recording tracks are overlapped each other.

The operation proceeds to a block 53 in which the MPU 16 selects the head of the data recording surface which contains the least number of servo tracks. As described before, the MPU 16 keeps the number of servo tracks written in each data recording surface #1 through #6 in the counters, and the MPU 16 can select the data recording surface which contains the least number of servo tracks, such as the data recording surface #3. The operation proceeds to a block 54 in which the head #3 of the data recording surface #3 is moved to the reference position. It is noted that the operation of the blocks 54 through 63 are the same as the operation of the blocks 33 through 42 shown in FIGS. 10 and 11, except that in the block 58, the distance of the movement of the head #3 from the position P1 to P2, from the P2 to P3, and so on, is selected to the distance $H_w/2$ to form or define the data recording tracks #1 and #2 without any overlap and any gap width, as shown in FIG. 15(A), based upon the specified parameter Y=0 in the block 52.

After the servo patterns are rewritten on the entire surface of the data recording surface #3, the operation proceeds to a block 64 in FIG. 14 in which the MPU 16 determines the total number of data recording tracks (N1) on all the data recording surfaces #1 through #6 based upon the count values, i.e., the total number of the servo tracks (N2) on the data recording surfaces #1 through #6, in the same manner as in the block 45 in FIG. 11. In this determination, the following expression is used, as described before: N1=N2/2−1.

The operation proceeds to a block 65 in which the MPU 16 determines whether the total number N1 is equal to or larger than a predetermined number "X", or not, in the same manner as in the block 46 in FIG. 11. If the answer of the block 65 is YES, the operation proceeds to a block 71 in which the operation is terminated. If the answer of the block 65 is NO, the operation proceeds to a block 66 in which the MPU 16 determines whether all the recording surfaces #1 through #6 are rewritten, or not. If the answer of the block 66 is NO, the operation proceeds to a block 67 in which the MPU 16 selects the head of the data recording surface which contains the second least number of servo tracks. In this case, the head #6 of the data recording surface #6 is selected since this data recording surface #6 is also written by the head #6 of the head width of 1.4 μm, and the number of data tracks is smaller than that of the remaining data recording surfaces.

The operation returns to the block 54 to rewrite the servo patterns A and B on the data recording surface #6, and the operation of the blocks 54 through 65 is repeated. If the answer of the block 65 is NO, and the answer of the block 66 is NO, the servo patterns are rewritten on the remaining data recording surfaces, such as the data recording surface #1 or #4. If the answer of the block 65 is NO, and the answer of the block 66 is YES after repeating the above operation, it indicates that the total number of the data recording tracks of the all data recording surfaces is still smaller than the predetermined value "X", though the servo patterns are rewritten on the all data recording surfaces #1 through #6 to form the data recording tracks adjacent each other without gap, as shown in FIG. 15(A). In this case, the operation proceeds to a block 68 in which the MPU 16 changes the value of the overlap width Y to a new value Y+10. Describing the operation of the block 68, the block 68 specifies one of the following plural values of the overlap width Y each time the answer of the block 66 is YES to perform the following operations.

Operation of case 1: Y=0
Operation of case 2: Y=10
Operation of case 3: Y=20

That is, the block increases the value Y by 10 in response to the answer YES of the block 66.

The operation of case 1 is shown in FIG. 15(A), in which the head is moved by the distance D1=$H_w$/2 in rewriting the servo patterns A and B, so that the resultant data recording tracks #1 and #2 are formed or defined without any overlap and any gap. The operation of case 2 is shown in FIG. 15(B), in which the Y=10 means that the servo patterns A and B are rewritten to define or form the data recording tracks #1 and #2 which are overlapped by 10% of the head width. It should be recalled that the following expression: Overlap width= Head width (HW)×Y (%).

To realize the 10% overlap of the data recording tracks, the head is moved by the distance D2=$H_w$/2−($H_w$×0.05). That is, the head is moved by the distance equal to 45% of the head width $H_w$. The case 3 is shown in FIG. 15(C), in which the servo patterns A and B are rewritten to form or define the data recording tracks #1 and #2 overlapped by 20% of the head width. To realize the 20% overlap of the data recording tracks, the head is moved by the distance D3=$H_w$/2−($H_w$×0.1). That is, the head is moved by the distance equal to 40% of the head width $H_w$.

In this manner, the MPU 16 determines whether the total number of data recording tracks of the all recording surfaces reaches the required number in the blocks 65 and 66, and if the answer is NO, the MPU 16 increases the overlap width to the next value, and rewrites the servo patterns using the new value. In the embodiment of the present invention, the Y=20 is the maximum value, as shown in a block 69, so that if the answer of the block 69 is YES, and the operation proceeds to a block 70. It indicates that although the servo patterns on the all data recording surfaces are rewritten by moving the head by the distance D3 to form the data recording tracks overlapped each other by 20% of the head width as shown in FIG. 15(C), the total number of data recording tracks of the all surfaces #1 through #6 does not reach the required number "X" in the block 65. The block 70 indicates that the result is a fail, and the operation is terminated in this block 70. An experimental study indicates that the probability of going to the block 70 is less than 1%, and the desired number of the data recording tracks are written in the case 1 or the case 2 at the probability more than 99%.

FIG. 16(A) shows a data write scheme in accordance with the present invention. It is assumed that the three magnetic recording disks 5A, 5B and 5C are mounted on the spindle motor 13 to provide the six data recording surfaces #1 through #6. A start address is assigned to the outer most data recording track of the first data recording surface #1, and the addresses of data recording tracks are successively assigned from the outer most data recording track to an inner most data recording track of the first data recording surface #1. The address of the inner most data recording track of the first data recording surface #1 is followed by an address of an outer most data recording track of the second data recording surface #2, and the addresses on the second data recording surface #2 are successively assigned from the outer most data recording track to an inner most data recording track of the second data recording surface #2, and so on, as shown by arrows 24A through 24F.

The data is written in a direction from the outer most data track to the inner most data track of the data recording surface #1, as shown by an arrow 24A, then the data is written in a direction from the outer most data track to the inner most data track of the data recording surface #2, as shown by an arrow 24B, then the data is written in a direction from the outer most data track to the inner most data track of the data recording surface #3, as shown by an arrow 24A, and so on.

FIG. 16(B) shows a data write scheme of the prior cylinder scheme. The data is written in a direction of an arrow 25A, then in a direction of an arrow 25B, then in a direction of an arrow 25C, and so on. Since the number of data recording tracks of the data recording surfaces #1 through #6 is probably differ from each other, due to the difference in the width of the data recording tracks and the gaps in the data recording surfaces as shown in the Table 2, the invention uses the data write scheme shown in FIG. 16(A).

The present invention solves the first problem described before that the useless or waste space exists between the data recording tracks of the GMR heads when the data recording tracks are formed with an uniform track pitch.

Further, the present invention solves the second problem described before, as shown below. In the prior scheme in which the uniform track pitch is used, the variation.

| Track width (μm) | 0.6 | 1.0 | 1.4 |
|---|---|---|---|
| Track pitch (μm) | 1.6 | 1.6 | 1.6 |
| 10% of track pitch (μm) | 0.16 | 0.16 | 0.16 |
| Variation of feedback signal | 26.7% | 16.0% | 11.4% |

In the scheme of the present invention in which the track pitch varies depending upon the track width, the variation of the levels of the feedback signal is an uniform value, as follows.

| Track width (μm) | 0.6 | 1.0 | 1.4 |
|---|---|---|---|
| Track pitch (μm) | 0.66 | 1.1 | 1.54 |
| 10% of track pitch (μm) | 0.066 | 0.11 | 0.154 |
| Variation of feedback signal | 11.0% | 11.0% | 11.0% |

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A data recording disk comprising:
   a first data recording surface and a second data recording surface, wherein a track pitch of adjacent data recording tracks of said first data recording surface differs from a track pitch of adjacent data recording tracks of said second data recording surface and a gap width between the adjacent data recording tracks of the first data recording surface differs from a gap width between the adjacent data recording tracks of the second data recording surface, wherein the gap width is set to be proportional to a width of the adjacent data recording tracks to provide a substantially uniform variation in a feedback signal generated in response to a servo pattern.

2. The data recording disk according to claim 1, wherein all data recording tracks of said first data recording surface have substantially the same track width, and all gaps of said first data recording surface have substantially the same gap width.

3. The data recording disk according to claim 2, wherein all data recording tracks of said second data recording surface have substantially the same track width, and all gaps of said second data recording surface have substantially the same gap width.

4. The data recording disk according to claim 1, wherein data is written in a direction from an outer most data recording track to an inner most data recording track of said first data recording surface, then said data is written in a direction from an outer most data recording track to an inner most data recording track of said second data recording surface.

5. The data recording disk according to claim 1, wherein addresses of data recording tracks are successively assigned from an outer most data recording track to an inner most data recording track of said first data recording surface, and said address of said inner most data recording track of said first data recording surface is followed by an address of an outer most data recording track of said second data recording surface, and said addresses on said second data recording surface are successively assigned from said outer most data recording track to an inner most data recording track of said second data recording surface.

6. A data recording disk comprising:
a first data recording surface and a second data recording surface, wherein a number of data recording tracks of said first data recording surface differs from a number of data recording tracks of said second data recording surface, and a gap width between said data recording tracks of said first data recording surface differs from a gap width between said data recording tracks of said second data recording surface, wherein the gap width is set to be proportional to a width of the data recording tracks to provide a substantially uniform variation in a feedback signal generated in response to a servo pattern.

7. The data recording disk according to claim 6, wherein all data recording tracks of said first data recording surface have substantially the same track width, and all gaps of said first data recording surface have substantially the same gap width.

8. The data recording disk drive device according to claim 7, wherein all data recording tracks of said second data recording surface have substantially the same track width, and all gaps of said second data recording surface have substantially the same gap width.

9. The data recording disk according to claim 6, wherein data is written in a direction from an outer most data recording track to an inner most data recording track of said first data recording surface, then said data is written in a direction from an outer most data recording track to an inner most data recording track of said second data recording surface.

10. The data recording disk according to claim 6, wherein addresses of data recording tracks are successively assigned from an outer most data recording track to an inner most data recording track of said first data recording surface, and said address of said inner most data recording track of said first data recording surface is followed by an address of an outer most data recording track of said second data recording surface, and said addresses on said second data recording surface are successively assigned from said outer most data recording track to an inner most data recording track of said second data recording surface.

11. A data recording disk comprising;
a first data recording surface and a second data recording surface, wherein the number of data recording tracks of said first data recording surface differs from the number of data recording tracks of said second data recording surface and a gap width between the number of data recording tracks of the first data recording surface differs from a gap width between the number of data recording tracks of the second data recording surface, wherein the gap width is set to be proportional to a width of the data recording tracks to provide a substantially uniform variation in a feedback signal generated in response to a servo pattern.

12. A disk drive device comprising;
data recording surfaces on a rotating data recording disk, each of said data recording surfaces is provided with a read/write head, wherein a number of data recording tracks of a first data recording surface differs from a number of data recording tracks of a second data recording surface, and a gap width between said data recording tracks of said first data recording surface differs from a gap width between said data recording tracks of said second data recording surface, wherein the gap width is set to be proportional to a width of the data recording tracks to provide a substantially uniform variation in a feedback signal generated in response to a servo pattern.

13. The disk drive device according to claim 12, wherein all data recording tracks of said first data recording surface have substantially the same track width, and all gaps of said first data recording surface have substantially the same gap width.

14. The disk drive device according to claim 13, wherein all data recording tracks of said second data recording surface have substantially the same track width, and all gaps of said second data recording surface have substantially the same gap width.

15. The disk drive device according to claim 12, wherein data is written in a direction from an outer most data recording track to an inner most data recording track of said first data recording surface, then said data is written in a direction from an outer most data recording track to an inner most data recording track of said second data recording surface.

16. The disk drive device according to claim 12, wherein addresses of data recording tracks are successively assigned from an outer most data recording track to an inner most data recording track of said first data recording surface, and said address of said inner most data recording track of said first data recording surface is followed by an address of an outer most data recording track of said second data recording surface, and said addresses on said second data recording surface are successively assigned from said outer most data recording track to an inner most data recording track of said second data recording surface.

* * * * *